US012609473B2

(12) United States Patent
Pottier et al.

(10) Patent No.: US 12,609,473 B2
(45) Date of Patent: Apr. 21, 2026

(54) ELECTRICAL TERMINAL HAVING A HOOD WITH A POLARIZATION RIB AND INDENTATION, WHICH PARTIALLY SURROUNDS A CONTACT

(71) Applicant: Molex, LLC, Lisle, IL (US)

(72) Inventors: Yves Le Pottier, Ann Arbor, MI (US); Dwaraganathan Bhagyanathan-Sathianathan, Rochester Hills, MI (US); Suraj Handithavalli Purushothama, Royal Oak, MI (US); Kevin C. Hough, Lincoln, NE (US)

(73) Assignee: Molex, LLC, Lisle, IL (US)

( * ) Notice: Subject to any disclaimer, the term of this patent is extended or adjusted under 35 U.S.C. 154(b) by 350 days.

(21) Appl. No.: 18/269,477

(22) PCT Filed: Dec. 22, 2021

(86) PCT No.: PCT/IB2021/062196
§ 371 (c)(1),
(2) Date: Jun. 23, 2023

(87) PCT Pub. No.: WO2022/137169
PCT Pub. Date: Jun. 30, 2022

(65) Prior Publication Data

US 2024/0055789 A1 Feb. 15, 2024

Related U.S. Application Data

(60) Provisional application No. 63/128,875, filed on Dec. 22, 2020.

(51) Int. Cl.

| | |
|---|---|
| ***H01R 13/11*** | (2006.01) |
| ***H01R 13/52*** | (2006.01) |

(52) U.S. Cl.
CPC ......... *H01R 13/11* (2013.01); *H01R 13/5205* (2013.01)

(58) Field of Classification Search
CPC ............................ H01R 13/11; H01R 13/5205
See application file for complete search history.

(56) References Cited

U.S. PATENT DOCUMENTS

| | | | | |
|---|---|---|---|---|
| 5,951,336 A * | 9/1999 | Seko | .................... | H01R 13/432 439/748 |
| 5,951,338 A * | 9/1999 | Seko | ...................... | H01R 13/18 439/843 |

(Continued)

FOREIGN PATENT DOCUMENTS

| | | |
|---|---|---|
| EP | 1271701 A1 | 1/2003 |
| JP | H1050376 A | 2/1998 |

(Continued)

OTHER PUBLICATIONS

International Search Report and Written Opinion received for PCT International Application No. PCT/IB2021/062196, mailed on Apr. 6, 2022 , 10 pages.

(Continued)

*Primary Examiner* — Harshad C Patel

(57) ABSTRACT

An electrical terminal includes a contact partially surrounded by a hood. In an embodiment, the contact has a deflectable contact beam and an indentation with which a male terminal engages. In an embodiment, the hood has a polarization rib having at least one flap which is configured to expand the seal. The electrical terminal is used with a connector assembly having a housing forward of a seal and a seal cover rearward thereof. A first length is defined between ends of the portion of the hood that surrounds the (Continued)

contact and a second length is defined between the ends of the seal. In an embodiment, the first length is a minimum of 1.1 times the second length.

20 Claims, 14 Drawing Sheets

(56) References Cited

U.S. PATENT DOCUMENTS 5,954,548 A * 9/1999 Stabroth .............. H01R 13/434 439/748
5,975,964 A * 11/1999 Seko ...................... H01R 13/18 439/857
6,102,752 A 8/2000 Bommel
6,186,840 B1 * 2/2001 Geltsch .................. H01R 13/18 439/748
6,394,858 B1 * 5/2002 Geltsch ................ H01R 13/114 439/852
6,860,768 B2 * 3/2005 Zhao ...................... H01R 13/11 439/852
8,858,274 B2 * 10/2014 Jakoplic ................... H01R 4/22 439/877
9,368,906 B2 * 6/2016 Endo ...................... H01R 13/05
9,799,980 B2 * 10/2017 Jakoplic ................. H01R 4/185
D847,761 S * 5/2019 Bhagyanathan Sathianathan ....... D13/154
10,374,328 B2 * 8/2019 Bhagyanathan-Sathlanathan ....... H01R 4/185
10,886,664 B2 * 1/2021 Sathianathan ..... H01R 13/5205
11,264,754 B2 * 3/2022 Sathianathan ......... H01R 13/18
11,742,606 B2 * 8/2023 Racho .................... H01R 31/06 439/77
11,824,296 B2 * 11/2023 Nozaki .................. H01R 13/11
2003/0199211 A1 10/2003 Fukatsu et al.
2007/0099520 A1 5/2007 Anbo et al.
2014/0322995 A1 * 10/2014 Frimmersdorf .......... H01R 4/28 29/874
2015/0364857 A1 12/2015 Endo et al.
2016/0268701 A1 * 9/2016 Nagasaki ................. H01R 4/58
2017/0047677 A1 * 2/2017 Bhagyanathan Sathianathan ....... H01R 43/26
2020/0006890 A1 1/2020 Sathianathan et al.

FOREIGN PATENT DOCUMENTS

JP H1050377 A 2/1998
JP H1055838 A 2/1998
JP 2007250530 A 9/2007
JP 2011222213 A 11/2011
JP 2013026155 A 2/2013
JP 2016213000 A 12/2016
JP 2020522112 A 7/2020

OTHER PUBLICATIONS

International Preliminary Report on Patentability received for PCT Application No. PCT/IB2021/062196, mailed on Jul. 6, 2023, 08 Pages.

* cited by examiner

ELECTRICAL TERMINAL HAVING A HOOD WITH A POLARIZATION RIB AND INDENTATION, WHICH PARTIALLY SURROUNDS A CONTACT

RELATED APPLICATIONS

This application is a U.S. National Phase Patent Application of International Patent Application No. PCT/IB2021/062196, filed on Dec. 22, 2021, which claims priority to U.S. Provisional Patent Application No. 63/128,875, filed on Dec. 22, 2020, both of which is are incorporated herein by reference in their entireties.

TECHNICAL FIELD

This disclosure relates to the field of electrical terminals.

BACKGROUND ART

In certain conditions, exposure to the environment cannot be avoided and a structure is needed to seal an electrical connection from moisture and debris. In these instances, a sealed system is required which involves providing a moisture resistant barrier between cooperating electrical connectors. Generally, the sealing aspect is disposed between the mating interface of the connectors and, additionally, at the wire end or harness end of each of the connectors. In certain instances, the terminals of the connector may need to be serviced or replaced, which involves removing the terminal from the connector. In these cases, one can appreciate a terminal that can be removed from a connector which does not damage the seal during service.

SUMMARY

In some embodiments, an electrical terminal includes a contact and a hood partially surrounding the contact. The contact is formed of a body having a passageway therethrough, and deflectable contact beam extending from a wall of the body and into the passageway. The hood is formed of a body having a passageway therethrough, a planar top wall, and a polarization rib extending from the top wall and overlapping a portion of an upper surface of the top wall. A front end of the polarization rib is spaced rearwardly from a front end of the body of the hood. A front flap extends from the front end of the polarization rib and at an angle relative to the planar top wall. A free end of the front flap is proximate to the top wall. A rear flap may extend from a rear end of the polarization rib and at an angle relative to the planar top wall.

In some embodiments, an electrical terminal includes a contact and a hood partially surrounding the contact. The contact is formed of a body having a passageway therethrough, deflectable contact beam extending from a first wall of the body and into the passageway, and an indentation formed in a second wall of the body and into the passageway. The second wall is opposite from the first wall. The hood is formed of a body having a passageway therethrough. In an embodiment, a male terminal is provided and is configured to engage with the indentation and the contact beam upon insertion into the contact.

In some embodiments, a combination including an electrical terminal and a connector assembly is provided. The electrical terminal includes a contact having a deflectable contact beam which extends into a passageway thereof, and a wire securing portion configured to connect to exposed conductors of a lead wire and to connect to insulation of the lead wire, and a hood partially surrounding the contact, the hood having a polarization rib extending from a top wall and overlapping a portion of an upper surface of the top wall. A first length is defined by a portion of the hood that overlays the contact. The connector assembly includes a housing, a seal and a seal cover. The housing is disposed forward of the seal and the seal cover is disposed rearward of the seal. A second length is defined between front and rear ends of the seal. The first length is a minimum of 1.1 times the second length.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

DETAILED DESCRIPTION

The drawings illustrate an embodiment of the present disclosure and it is to be understood that the disclosed embodiment is merely exemplary of the disclosure, which may be embodied in various forms. Therefore, specific details disclosed herein are not to be interpreted as limiting, but merely as a basis for the claims and as a representative basis for teaching one skilled in the art to variously employ the present disclosure.

The present disclosure is directed to an electrical terminal 20 which mates with a connector assembly 200 and a male terminal 202, such as a pin or a blade. The drawings illustrate a single circuit of the connector assembly 200 such that the illustrations for each element of the connector assembly 200 are a single slice or portion of the entire connector assembly 200; multiple circuits are provided to form the complete connector assembly 200. It should also be noted that directions such as “front”, “rear”, “top”, “upper”, “bottom” and “lower”, etc. are used herein for convenience in description, do not denote a required orientation during use, are arbitrary, and are used to provide a clearer understanding of the embodiments shown. An example connector assembly 200 is described in U.S. Pat. No. 10,886,664, which is incorporated by reference in its entirety, and as such, only the components used for the present disclosure are discussed herein.

Figure 1:
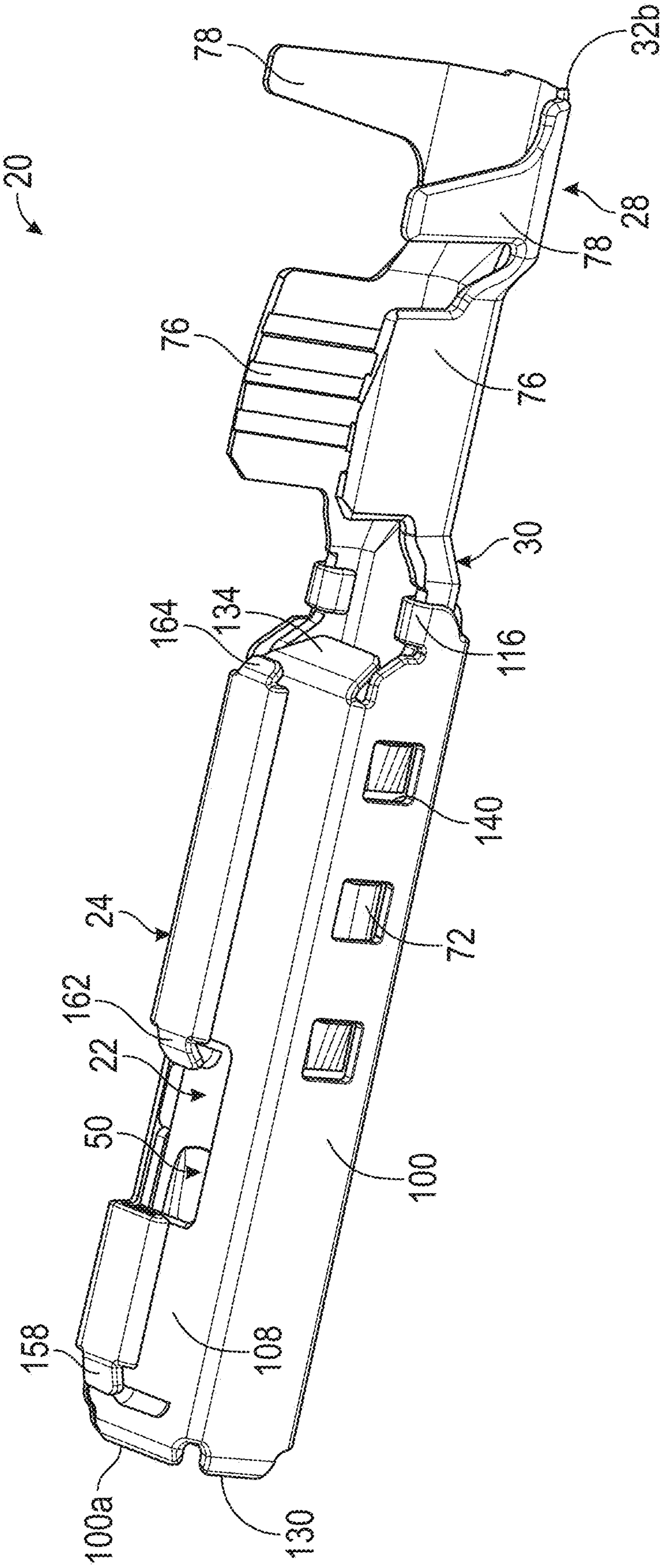
FIG. 1 depicts a rear perspective view of an electrical terminal.
Figure 2:
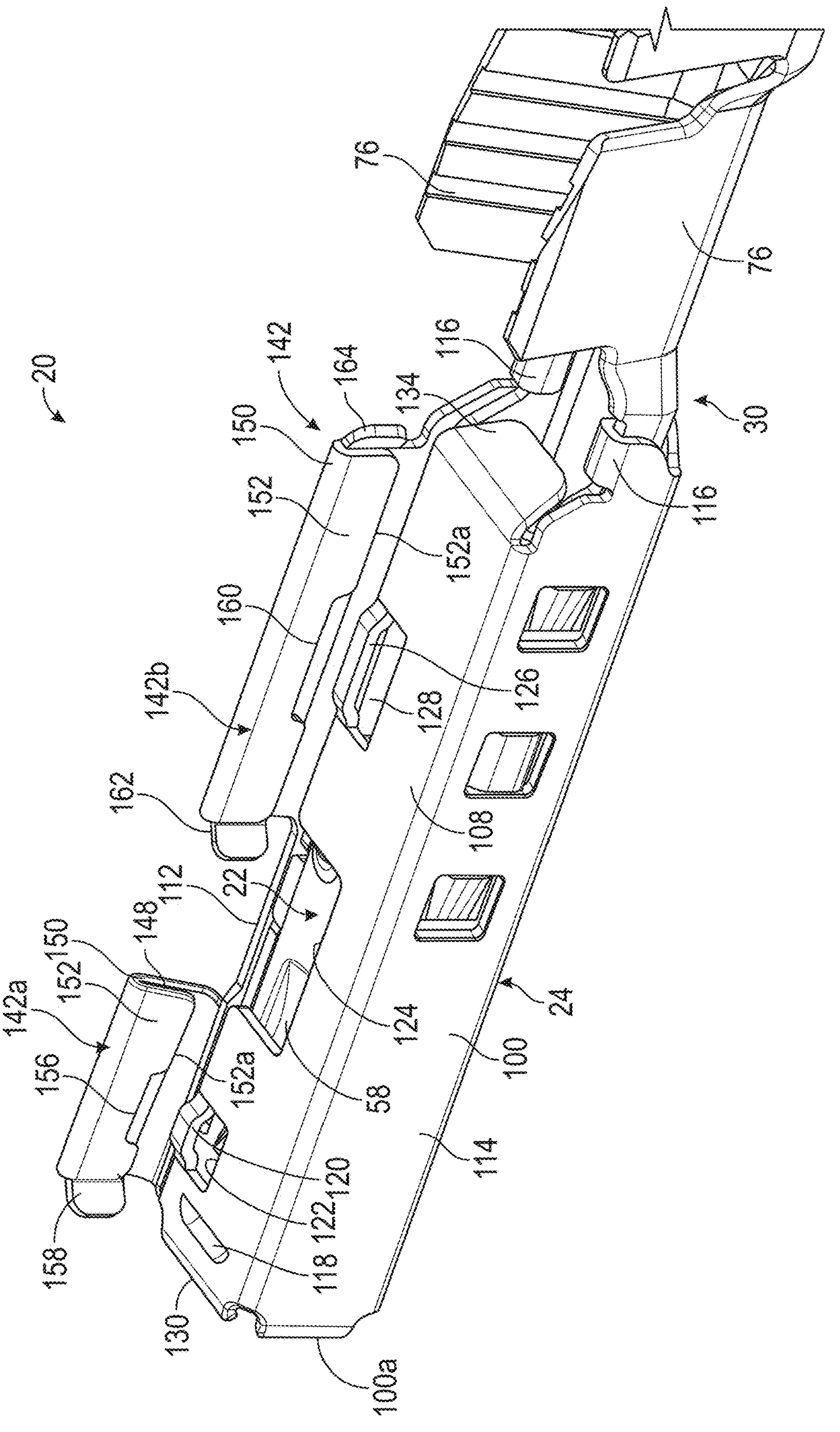
FIG. 2 depicts a rear perspective view of the electrical terminal with an alignment rib thereof in a lifted position.

As shown in FIGS. 1 and 2, the electrical terminal 20 includes a contact 22 mounted within a hood 24 such that the hood 24 partially surrounds the contact 22. The contact 22 is stamped and formed from a single piece of a highly conductive material, such as copper or any other copper based alloy or similar material having the same electrical conducting properties, allowing for superior electrical performance. The hood 24 is stamped and formed from a single piece of sheet metal formed of a high strength tensile material, such as stainless steel, to provide superior retention force and reinforcement. The electrical terminal 20 receives the male terminal 202. The contact 22 and the hood 24 are formed separately, and are secured together via a separate assembly or marriage die. An electrical lead wire (not shown) is attached to the contact 22 as described herein. As is known in the art, the lead wire has an insulative covering over conductors. The insulative covering is partially removed at a leading end of the lead wire to expose the conductors provided therein.

The contact 22 is best shown in FIGS. 4-7. The contact 22 has a contact portion 26 which is configured to provide an electrical connection to the corresponding male terminal 202, a wire securing portion 28 which is configured to be coupled to the lead wire, and a transition portion 30 which connects the contact portion 26 to the wire securing portion 28.

The contact portion 26 is formed of a body 32 having opposite front and rear ends **32*a*, 32*b* and having a passageway 34 formed therethrough which extends from the front end 32*a* to the rear end 32*b*, and a deflectable contact beam 36 extending from the body 32 and into the passageway 34. All edges forming the front and rear ends 32*a*, 32*b* are chamfered or rounded; the edges are smoothed to remove burrs in the metal. A centerline 38 of the passageway 34 is defined along the length of the body 32 from the front end 32*a* to the rear end 32*b*. The body 32 is formed of opposite top and bottom walls 40, 42 which are separated from each other by first and second upright side walls 44, 46 to form the passageway 34. Interior and exterior surfaces of each wall 40, 42, 44, 46 are planar, except as described herein. Front edges of the walls 40, 42, 44, 46 form an entrance opening 48 into the passageway 34. The front edges of the of the walls 40, 42, 44, 46 are chamfered or rounded; the front edges of the of the walls 40, 42, 44, 46** are smoothed to remove burrs in the metal.

An indentation 50 is formed in the top wall 40 proximate to, but spaced from, the front end **32*a* of the body 32. The indentation 50 extends into the passageway 34 and forms an internal bump. The indentation 50 has a front end that is spaced from the front end 32*a* and a longitudinally spaced rear end, and is formed of an angled portion 52 extending from the front end thereof which transitions into an elongated, generally bowl-shaped recess 58 that defines the rear end of the indentation 50**.

A projection 60 extends upward from the top wall 40 and positioned rearward of the rear end of the indentation 50. The projection 60 may be formed as a half dome, having a rear end that is perpendicular to the centerline 38.

A bottom opening 62 is formed in the bottom wall 42 proximate to, but spaced from, the front end **32*a* of the body 32. At least a rear edge of the opening 62 is chamfered or rounded; the edges are smoothed to remove burrs in the metal. In an embodiment, the indentation 50 and the opening 62** are vertically aligned.

The contact beam 36 extends rearwardly from the forward edge of the bottom opening 62, through the bottom opening 62 and into the passageway 34. The contact beam 36 is configured to electrically engage the mating male terminal 202. In an embodiment, the contact beam 36 has a front section 64 extending rearwardly from the forward edge of the bottom opening 62, an intermediate section 66 which extends rearwardly from the front section 64 and angles inwardly relative to the centerline 38 and relative to the front section 64, and a rear section 68 which extends rearwardly from the intermediate section 66 and curves inwardly and then outwardly relative to the centerline 38 and relative to the intermediate section 66. The rear section 68 terminates in a free rear end. At least the rear section 68 of the contact 36 is aligned with the bowl-shaped recess 58.

In an embodiment, a dimple 70 is provided on an interior surface of each side wall 44, 46 forwardly of the forward edge of the opening 62. The dimples 70 may have a dome shape.

A plurality of spaced apart protrusions 72 extend outwardly from the exterior surface of the side walls 44, 46 and are rearward of the indentation 50 and the opening 62. As shown, three protrusions 72 are provided, although more or fewer protrusions 72 may be provided. In an embodiment, each protrusion 72 has a rear face which extends perpendicular to the centerline 38.

A rear end **40*b* of the top wall 40 is longitudinally spaced forward of the rear end 32*b* of the body 32. Upper ends 44*b*, 46*b* of the side walls 44, 46 rearward of the rear end 40*b* of the top wall 40 curve downwardly and rearwardly from the rear end 40*b* of the top wall 40 to the rear end 32*b* of the body 32. The upper ends 44*b*, 46*b* are chamfered or rounded; the upper ends 44*b*, 46*b*** are smoothed to remove burrs in the metal.

The wire securing portion 28, in an embodiment, is generally U-shaped and is configured to receive the electrical lead wire. The wire securing portion 28 includes a curved base wall 74, wire crimp portions 76 extending upwardly from the base wall 74 and configured to connect to the exposed conductors of the lead wire, and insulation crimp portions 78 extending upwardly from the base wall 74 and configured to connect to the insulative covering of the lead wire. The base wall 74 is sized to accommodate the exposed conductors and the insulative covering of the electrical lead wire. The wire crimp portions 76 are forward of the insulation crimp portions 78. In an embodiment, the wire crimp portions 76 are formed as wings extending upwardly from the base wall 74, and the insulation crimp portions 78 are formed as wings extending upwardly from the base wall 74. To connect the lead wire to the wire securing portion 28, a front portion of the insulative covering is removed to expose the conductors. The bare conductors are placed within the base wall 74 below the wire crimp portions 76 and a portion of the lead wire having the intact insulative covering is placed within the base wall 74 below the insulation crimp portions 78. The portions 76, 78 are then folded over the respective portions of the lead wire to secure the lead wire to the contact 22, with the wire crimp portions 76 securing or crimping the contact 22 to the bare conductors and the insulation crimp portions 78 securing or crimping the insulative covering of the lead wire to the contact 22. When the electrical terminal 20 and the lead wire are connected together, a contact assembly is formed.

The transition portion 30 of the electrical terminal 20 extends between the contact portion 26 and the wire securing portion 28. The transition portion 30 has a generally U-shaped base wall 80 having side walls 82, 84 extending upwardly therefrom. A front portion of each side wall 82, 84 extends longitudinally and a rear portion of each side wall 82, 84 extends at an angle inwardly toward the centerline 38 from the front portion to the wire securing portion 28. A notch 86 is provided in the top edge of each front portion of the side walls 82, 84.

The hood 24 is best shown in FIGS. 8-12. The hood 24 is formed of a body 100 having opposite front and rear ends **100*a*, 100*b* and having a passageway 102 formed therethrough which extends from the front end 100*a* to the rear end 100*b*, and a cantilevered stiffening beam 104 extending from the body 100 and into the passageway 102. All edges forming the front and rear ends 100*a*, 100*b* are chamfered or rounded; the edges are smoothed to remove burrs in the metal. A centerline 106 of the passageway 102 is defined along the length of the body 100 from the front end 100*a* to the rear end 100*b*. The body 100 is formed of opposite top and bottom walls 108, 110 which are separated from each other by first and second upright side walls 112, 114 to form the passageway 102. Interior and exterior surfaces of each wall 108, 110, 112, 114** are planar, except as described herein.

A rear end of the top wall 108 is longitudinally forward of the rear end **100*b* of the body 100. Upper ends 112*a*, 114*a* of the side walls 112, 114 rearward of the rear end 100*b* of the top wall 108 curve downwardly and rearwardly from the rear end 100*b* of the top wall 108 to the rear end 100*b* of the body 100. The upper ends 112*a*, 114*a* are chamfered or rounded; the upper ends 112*a*, 114*a* are smoothed to remove burrs in the metal. In an embodiment, the upper ends 112*a*, 114*a* of each side wall 112, 114 includes a wall forming a folded over tab 116 which extends into the passageway 102**.

A projection 118 extends inwardly from the top wall 108 proximate to the front end **100*a* of the body 100 and into the passageway 102. The projection 118 acts as forward stops when the contact 22 is inserted into the hood 24 as described herein. In an embodiment, the projection 118 has a rear face which extends perpendicular to the centerline 106**.

Figure 3:
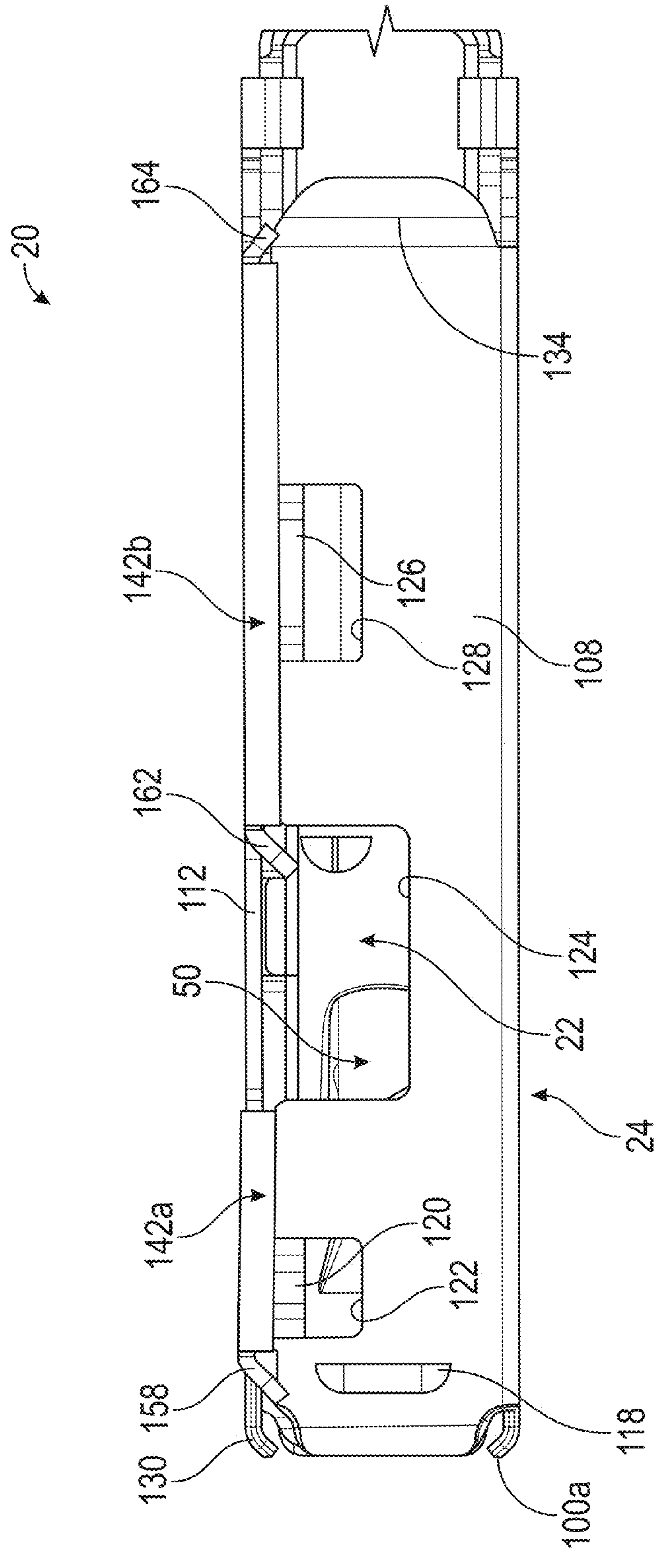
FIG. 3 depicts a top plan view of the electrical terminal with the alignment rib thereof in a lifted position.
Figure 4:
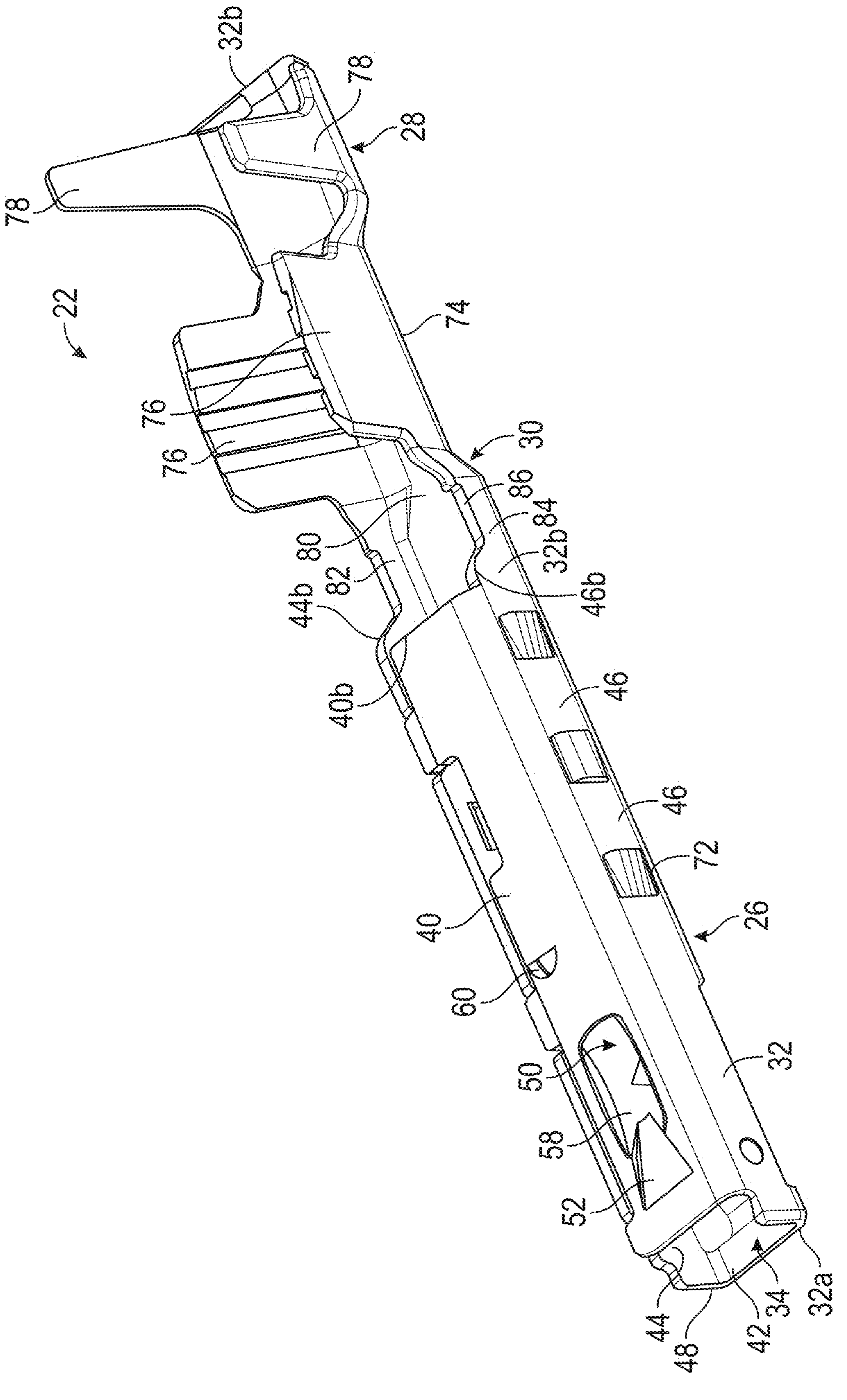
FIG. 4 depicts a front perspective view of a contact of the electrical terminal.
Figure 5:
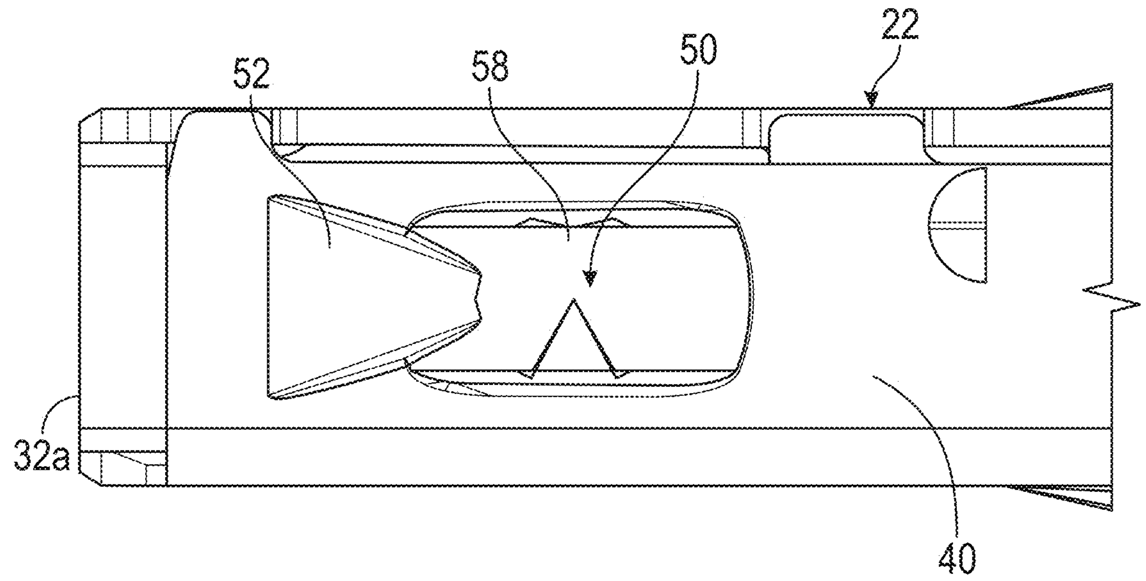
FIG. 5 depicts a partial top plan view of the contact.
Figure 6:
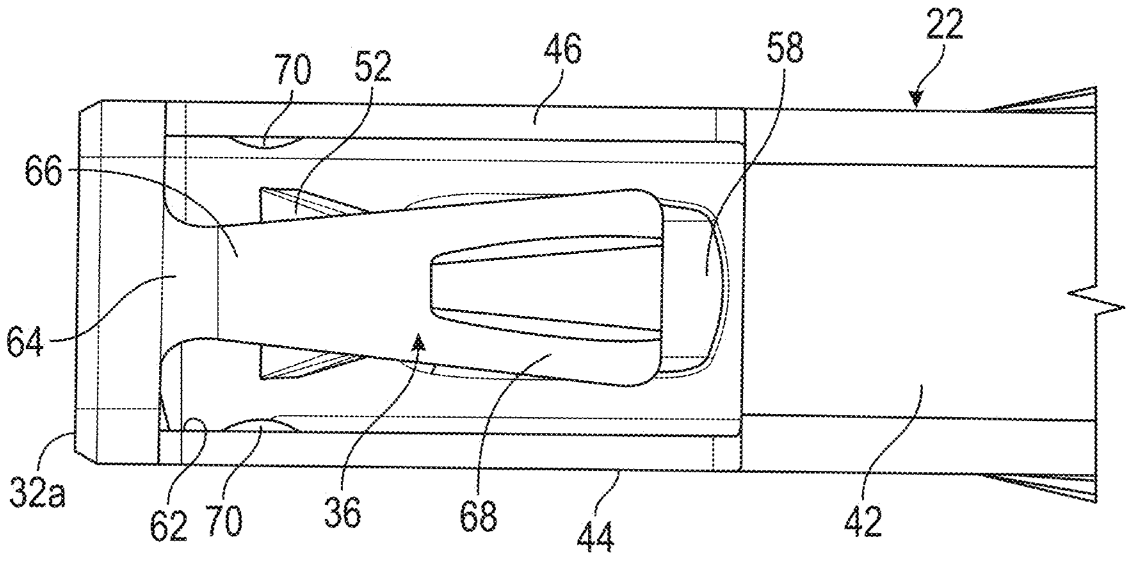
FIG. 6 depicts a partial bottom plan view of the contact.
Figure 7:
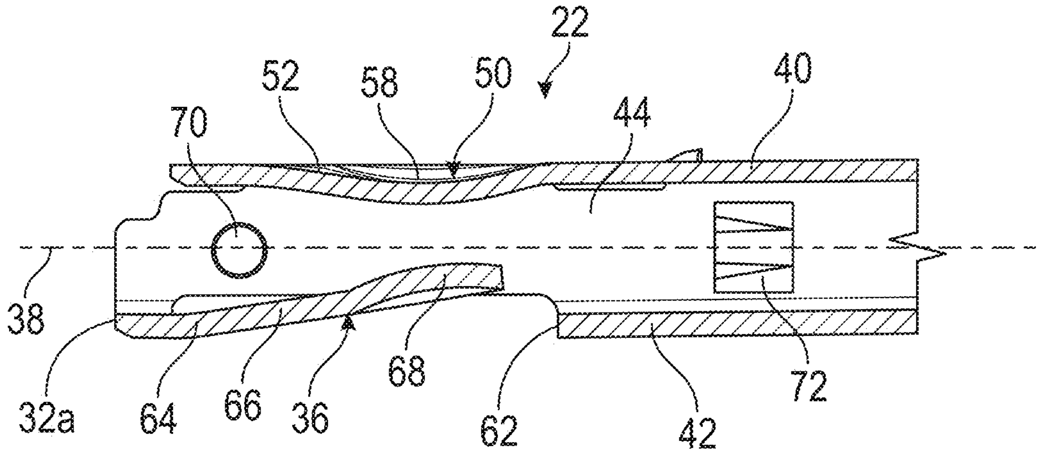
FIG. 7 depicts a partial cross-sectional view of the contact.
Figure 8:
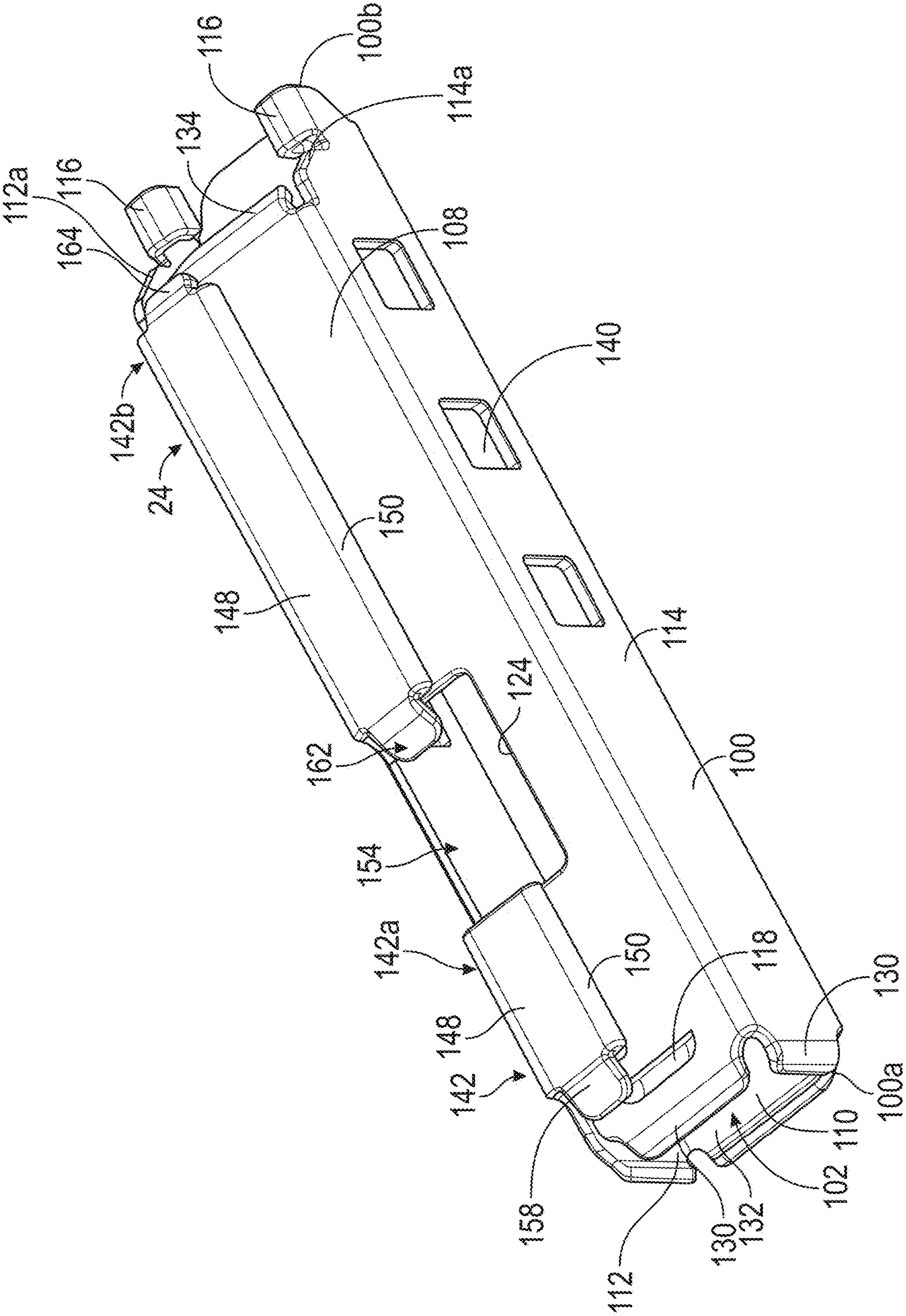
FIG. 8 depicts a front perspective view of a hood of the electrical terminal.
Figure 9:
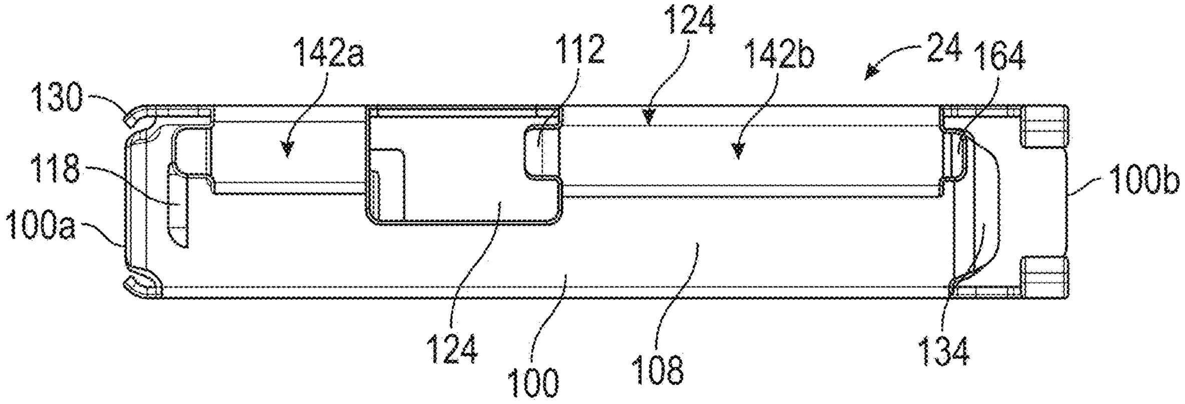
FIG. 9 depicts a top plan view of the hood.
Figure 10:
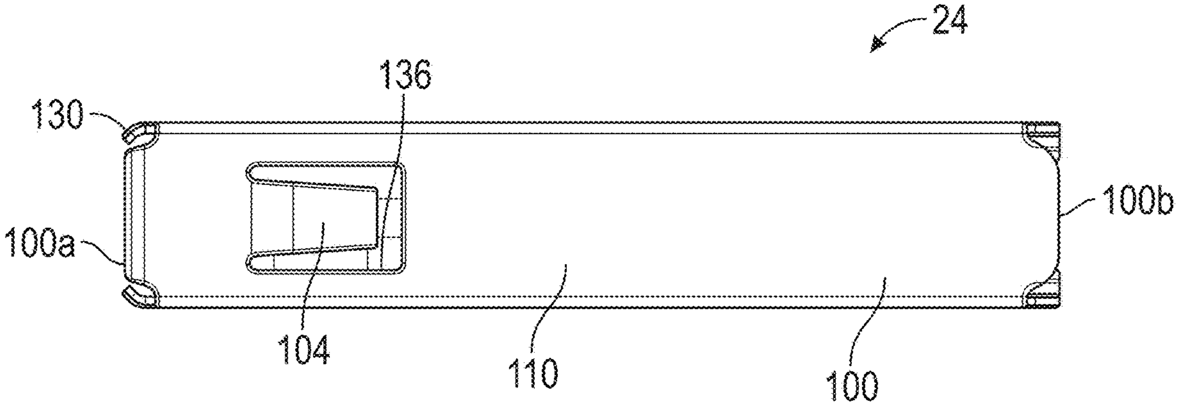
FIG. 10 depicts a bottom plan view of the hood.
Figure 11:
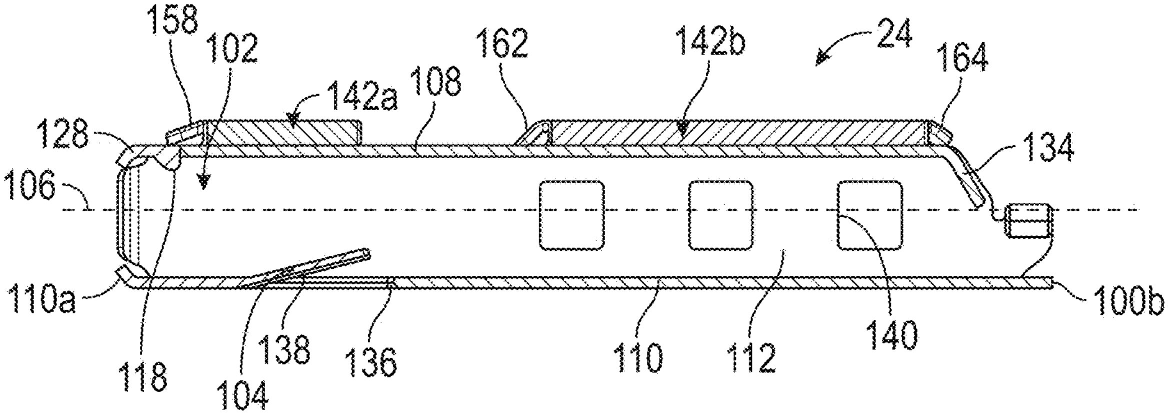
FIGS. 11 and 12 depict cross-sectional views of the hood.
Figure 12:
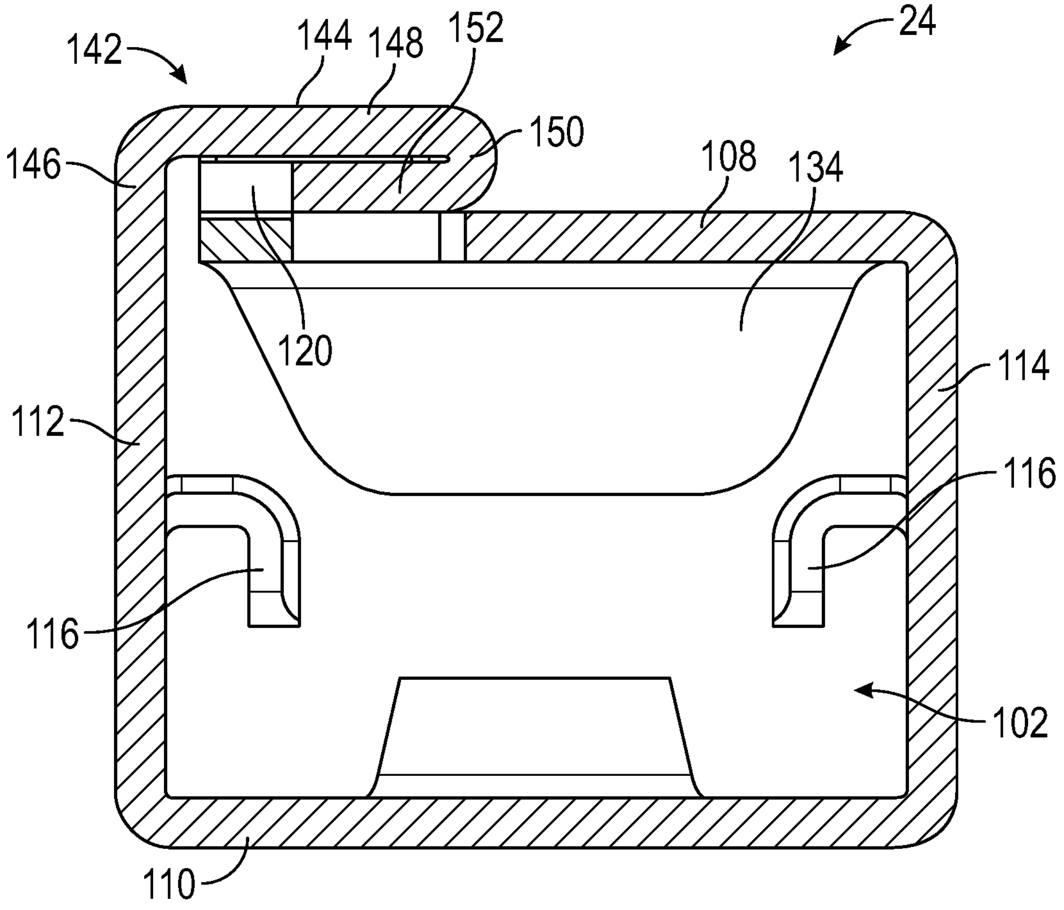

A front lock projection 120, see FIGS. 2 and 3, extends upwardly from the top wall 108 and is rearward of the projection 118, and spaced therefrom. The front lock projection 120 has a front angled portion extending from the top wall 108, an elongated portion extending from the front angled portion and extending parallel to the centerline 106, and a rear angled surface extending from the elongated portion to the top wall 108. The front lock projection 120 is proximate to the upper end of the side wall 112. A window 122 may be provided through the top wall 108 along the front lock projection 120.

An opening 124 is formed through the top wall 108 rearward of the front lock projection 120. Edges of the opening 124 are chamfered or rounded; the edges are smoothed to remove burrs in the metal. One side edge of the opening 124 extends along the top of the side wall 112.

A rear lock projection 126, see FIGS. 2 and 3, extends upwardly from the top wall 108 and is rearward of the opening 124, and spaced therefrom. The rear lock projection 126 has a front angled portion extending from the top wall 108, an elongated portion extending from the front angled portion and extending parallel to the centerline 106, and a rear angled surface extending from the elongated portion to the top wall 108. The rear lock projection 126 is proximate to the upper end of the side wall 112 and may be longitudinally aligned with the front lock projection 120. A window 128 may be provided through the top wall 108 along the rear lock projection 126.

In an embodiment, a curved flange 130 extends from the respective wall 108, 110, 112, 114 at the front end **100*a* of the body 100 and defines an entrance opening 132 into the passageway 102. The edges forming the flanges 130** are chamfered or rounded; the edges are smoothed to remove burrs in the metal.

A retaining finger 134 extends from the rear end of the top wall 108, at an angle relative to the centerline 106 and into the passageway 102. The retaining finger 134 has a width which is less than the width of the top wall 108.

A bottom opening 136 is formed in the bottom wall 110 proximate to, but spaced from, the front end **110*a* of the body 100. At least a rear edge of the opening 136** is chamfered or rounded; the edges are smoothed to remove burrs in the metal.

The stiffening beam 104 extends rearwardly from a forward edge of the bottom opening 136, through the bottom opening 136 and into the passageway 102. The stiffening beam 104 is configured to engage the contact beam 36 of the contact 22 to provide reinforcement of the contact beam 36. The stiffening beam 104 has a front end connected to a forward edge of the opening 136, and a section 138 which extends rearwardly from the forward edge of the opening 136 and is angled inwardly relative to the centerline 106. The section 138 terminates in a free rear end. At least the side edges forming the stiffening beam 104 are chamfered or rounded; the edges are smoothed to remove burrs in the metal. The length of the stiffening beam 104 is less than the length of the contact beam 36.

Each side wall 112, 114 has a plurality of spaced apart windows 140 therethrough which are configured to mate with the protrusions 72 on the side walls of the contact 22. The windows 140 are rearward of the stiffening beam 104.

A polarization rib 142 extends upwardly from the top wall 108 and overlaps a portion of the top wall 108 and a portion of the opening 124. The polarization rib 142 has front and rear ends and a planar top surface 144. All edges forming the front and rear ends are chamfered or rounded; the edges are smoothed to remove burrs in the metal.

The polarization rib 142 is formed of a folded over wall formed of a first wall portion 146 extending upwardly from the side wall 112, a second wall portion 148 extending from the top end of the first wall portion 146 and inwardly from the first wall portion 146, a third wall portion 150 extending from the end of the second wall portion 148 and forming a 180-degree bend, and a fourth wall portion 152 extending from the end of the third wall portion 150 and outwardly toward the first wall portion 146, such that the second wall portion 148 overlays the fourth wall portion 152. The fourth wall portion 152 ends in a free end **152*a*. A space 154 divides the polarization rib 142 into front and rear sections 142*a*, 142*b*. The opening 124 provided through the top wall 108 and at least partially aligns with the space 154**.

A front end of the front section **142*a* is proximate to, but spaced from, the front end 100*a* of the body 100 and a rear end of the of the front section 142***a* is proximate to the front end of the opening 124. In an embodiment, the front and rear ends of the front section 142*a* are perpendicular to the centerline 106 of the body 100. The fourth wall portion 152 of the front section 142*a* has a longitudinally extending lock recess 156 which extends from the free end 152*a* toward the third wall portion 150. A front flap 158 extends from the front end of the second wall portion 148 of the front section 142*a* and angles toward the centerline 106. A free end of the front flap 158 is proximate to the top wall 108. The front flap 158 has a width which is slightly less than the width of the second wall portion 148. A front end of the rear section 142*b* is proximate to the rear edge of the opening 124, and a rear end of the rear section 142*b* is proximate to, but spaced from, the rear end 100*b* of the body 100. In an embodiment, the front and rear ends of the rear section 142*b* are perpendicular to the centerline 106 of the body 100. The fourth wall portion 152 of the rear section 142*b* has a longitudinally extending lock recess 160 which extends from the free end 152*a* toward the third wall portion 150. A rear flap 164 extends from the front end of the second wall portion 148 of the rear section 142*b* and angles toward the centerline 106. A free of the rear flap 164 is proximate to the top wall 108. The rear flap 164 has a width which is slightly less than the width of the second wall portion 148. All edges forming the front and rear sections 142*a*, 142*b* and flaps 158, 162, 164 are chamfered or rounded; the edges are smoothed to remove burrs in the metal. In an embodiment, only the front flap 158 is provided. In an embodiment, only the rear flap 164 is provided.

To assemble the contact 22 with the hood 24 to form the electrical terminal 20, the hood 24 is partially formed with the stiffening beam 104 not bent relative to the bottom wall 110, the polarization rib 142 not bent or partially bent relative to the side wall 112, the side walls 112, 114 partially bent relative to the bottom wall 110, and the retaining finger 134 and the tabs 116 are only partially bent such that the retaining finger 134 and tabs 116 do not substantially extend into the partially formed passageway 102. The remaining features are formed on the hood 24.

The front end of the contact 22 is inserted through the opening formed at the rear end 100*b* of the body 100 of the hood 24 and is slid along the partially formed passageway 102 until the front end 32*a* of the body 32 of the contact 22 engages with the rear face of the projection 118 on the wall 108 (other projections may be formed on walls 110, 112, 114). The projection 118 acts as a stop which limits the further insertion of the contact 22 into the hood 24. Thereafter, the side walls 112, 114 are bent relative to the bottom wall 110 to the upright positions. During this bending, the top wall 108 engages with side wall 112, the protrusions 72 seat within the windows 140, and the protrusion 56 seats within the opening 124. The centerlines 38, 106 of the passageways 34, 102 align with each other and the upper ends 44*b*, 46*b*, 112*a*, 114*a* of the side walls 44, 46, 112, 114 align with each other. The stiffening beam 104 is bent inwardly to engage the contact beam 36. The retaining finger 134 is bent and since the retaining finger 134 is proximate to the rear end 32*b* of the body 32, the contact 22 is between the projection 118 and the retaining finger 134. As a result, the retaining finger 134 partially obstructs a rear end of the passageway 34 through the contact 22. The tabs 116 are folded over and engage with the notches 86 to further secure the contact 22 within the hood 24. The polarization rib 142 is bent relative to the side wall 112 and the top wall 108, and the front lock projection 120 seats within the lock recess 156, and the rear lock projection 126 seats within the lock recess 160. The bottom surface of the fourth wall portion 152 of the polarization rib 142 preferably engages against the top surface of top wall 108. The front flap 158 engages with the top wall 108, the front flap 162 engages with the protrusion 56, and the rear flap 164 engages with the top wall 108 above the retaining finger 134. The flaps 158, 162, 164 are used to assist in preventing seal tear as described herein. Therefore, it is critical that the polarization rib 142 maintain its form and does not spring-back away from the top wall 108. The engagement of the lock projection 120 within the lock recess 156 and the lock projection 126 seats within the lock recess 160 maintains the proper position of the polarization rib 142.

In an embodiment, all edges which form the various features of the contact 22 and the hood 24 are chamfered or rounded (even if not specifically described herein). All edges are smoothed to remove burrs in the metal.

While the protrusions 72 are described as being on the contact 22 and the windows 140 in the hood 24, the protrusions 72 can be provided on the hood 24 and the windows 140 formed in the contact 22.

The electrical terminal 20 and its attached lead wire are mounted within the connector assembly 200.

Figure 13:
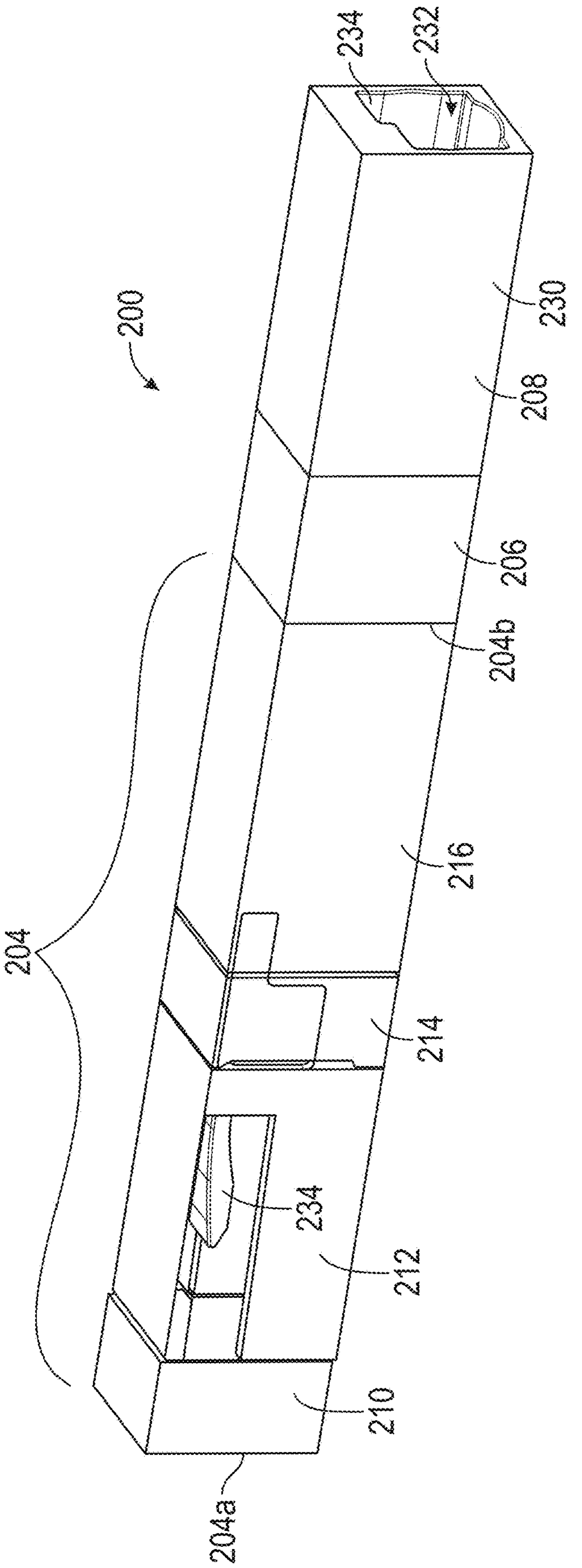
FIG. 13 depicts a rear perspective view of a connector assembly into which the electrical terminal is inserted.
Figure 14:
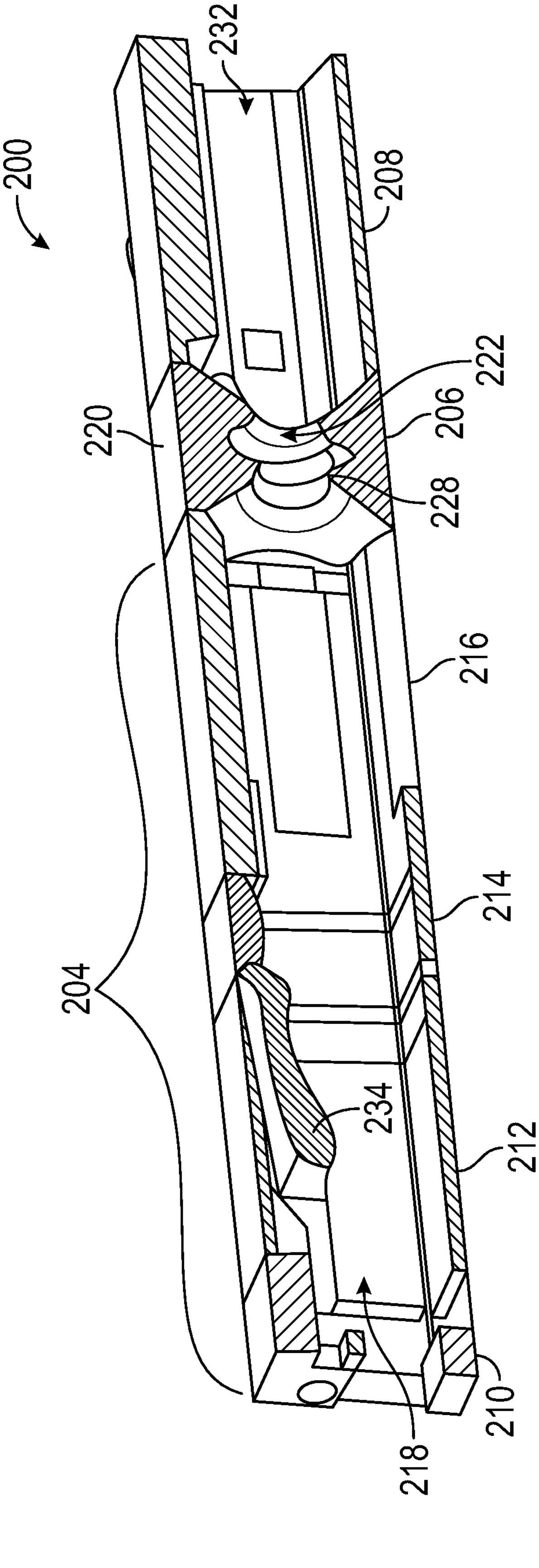
FIG. 14 depicts a cross-sectional view of the connector assembly.

As shown in FIGS. 13 and 14, an embodiment of the connector assembly 200 includes a housing 204 disposed forward of a seal 206 and a seal cover 208 disposed rearward of the seal 206. The specifics of the connector assembly 200 are described in U.S. Pat. No. 10,886,664, which is incorporated by reference in its entirety. As disclosed in U.S. Pat. No. 10,886,664, the housing 204 includes a front cover 210, a front housing 212, an independent secondary lock 214 and a rear housing 216. The components of the housing 204 define a longitudinal passageway 218 therethrough.

Figure 15:
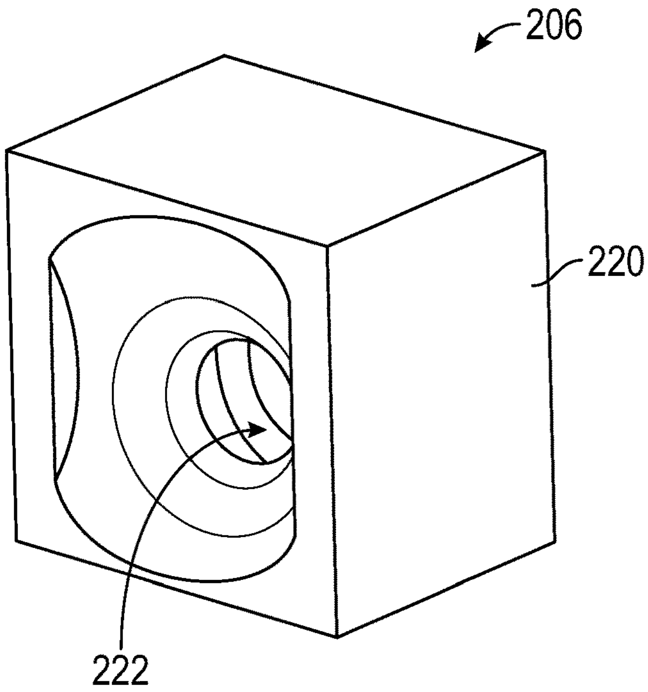
FIG. 15 depicts a front perspective view of a seal of the connector assembly.
Figure 16:
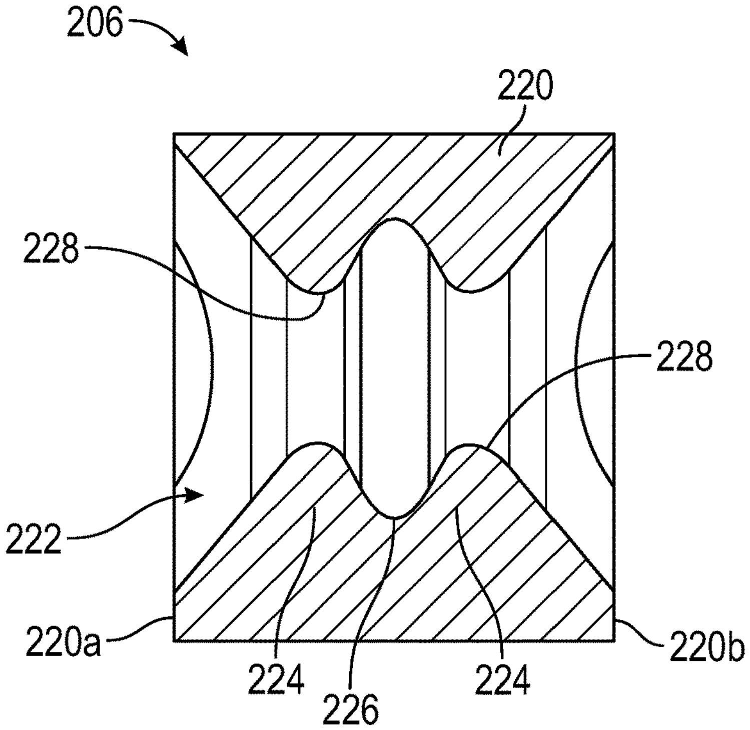
FIG. 16 depicts a cross-sectional view of the seal.
Figure 17:
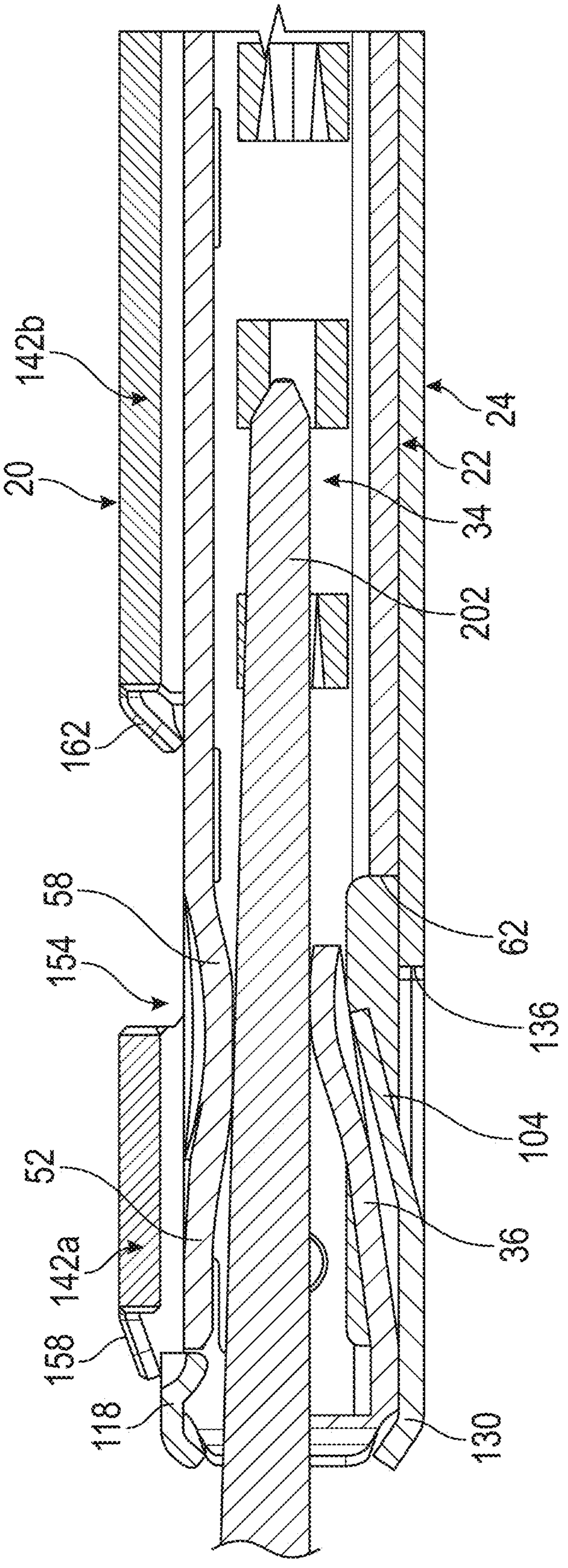
FIG. 17 depicts a cross-sectional view of the electrical terminal having a male connector mounted therein.

As shown in FIGS. 15 and 16, the seal 206 is formed of a compliant resilient material, such as rubber, and is configured to engage the insulative covering of the lead wire when the lead wire is inserted therethrough. The seal 206 is formed of a wall 220 having a longitudinally extending central aperture or passageway 222 extending therethrough from a front end 220*a* of the wall 220 to a rear end 220*b* thereof. A centerline of the passageway 222 is defined along the length of the wall 220 from the front end 220*a* to the rear end 220*b*. In an embodiment, the surface forming the passageway 222 is formed as a plurality of compressible lobes, lips or bladders 224 having a lobe 226 therebetween. The bladders 224 define innermost surfaces 228 of reduced dimension of the passageway 222. In an embodiment, the innermost surfaces 228 are circular in shape. The innermost surfaces 228 of the passageway 222 define a dimension which is less than the exterior dimension of the electrical terminal 20 defined between the top surface of the top wall 108 and the bottom surface of the bottom wall 110 and between the outer surfaces of the side walls 112, 114, and which is less than the diameter of the insulative covering of the lead wire. The seal 206 provides a resilient interface with the insulative covering of the lead wire to provide a moisture/debris resistant barrier.

As shown in FIG. 13, the seal cover 208 is formed of a body 230 having a longitudinally extending passageway 232 extending between front and rear ends thereof. The passageway 232 has surfaces forming a keyway 234 which corresponds to the shape of the polarization rib 142 of the hood 24. The passageway 232 is sized to allow the electrical terminal 20 and the insulative covering of the lead wire to pass therethrough without significant resistance. The keyway 234 properly aligns the electrical terminal 20 and prevents the electrical terminal 20 from rotating within the seal cover 208.

The passageways 218, 222, 232 longitudinally align with each other.

The front end 100*a* of the body 100 of the electrical terminal 20 is inserted through the open rear end of the seal cover 208 and into the passageway 232. The electrical terminal 20 must be inserted into the seal cover 208 in such a manner that the polarization rib 142 passes through the keyway 234.

After the electrical terminal 20 passes through the seal cover 208, the electrical terminal 20 is passed through the passageway 222 of the seal 206. As the electrical terminal 20 passes through seal 206, the front end 100*a* of the body 100 first engages with the innermost surfaces 228 and expands the seal 206 outwardly. The flanges 130 assist in reducing any tear risk of the seal 206 upon contact with the hood 24. The bladders 224 of the seal 206 compress to conform to the exterior shape of the hood 24. As the electrical terminal 20 continues to be passed through, the front flap 158 at the front end of the front section 142*a* of the polarization rib 142 next contacts the bladders 224 of the seal 206. The front flap 158 causes the innermost surfaces 228 to further expand so that the dimension between the between the top surface 144 of the front section 142*a* of the polarization rib 142 and the bottom surface of the bottom wall 110 is accommodated therewith. The front flap 158 assist in reducing any tear risk of the seal 206 upon contact with the front section 142*a* of the polarization rib 142. As the electrical terminal 20 continues to be passed through, the innermost surfaces 228 of the seal 206 pass into the space 154 and partially contracts its original shape. Thereafter, as the electrical terminal 20 continues to be passed through, the front flap 162 at the front end of the rear section 142*b* of the polarization rib 142 next contacts the bladders 224 of the seal 206. The front flap 158 causes the innermost surfaces 228 to further expand so that the dimension between the between the top surface 144 of the rear section 142*b* of the polarization rib 142 and the bottom surface of the bottom wall 110 is accommodated therewith. The front flap 158 assist in reducing any tear risk of the seal 206 upon contact with the rear section 142*b* of the polarization rib 142. Next, as the electrical terminal 20 continues to be passed through, the innermost surfaces 228 of the seal 206 partially contract when contact is made with the rear flap 164 and then the retaining finger 134. When the insulative covering of the lead wire is within the seal 206, the seal 206 contracts around the insulative covering of the lead wire and the bladders 224 engage and seal with the insulative covering. The electrical terminal 20 then passes into the passageway 218 in the housing 204 until a retention finger 236 on the housing 204 seats within the opening 124 in the electrical terminal 20 and the front ends of the flanges 130 of the electrical terminal 20 engage against the front cover 210 of the housing 204.

The male terminal 202 is then mounted within the connector assembly 200 and engaged with the electrical terminal 20 to engage with the contact beam 36. The male terminal 202 is passed through the passageway 218 in the front cover 210 and enters through the front end 32*a* of the passageway 34 in the contact 22. The male terminal 202 slides along the planar inner surface of the top wall 40 of the contact 22 and then engages with the angled portion 52 of the indentation 50 to move the male terminal 202 against the contact beam 36 which causes the contact beam 36 to move downward, and then engaged with the generally bowl-shaped recess 58 which further moves the male terminal 202 downward against the contact beam 36. This causes the contact beam 36 and the stiffening beam 104 to flex, with the stiffening beam 104 providing support for the contact beam 36. During this insertion, the rear section 68 of the contact beam 36 first flexes to allow entry of the male terminal 202 and to provide an initially low insertion force. As the male terminal 202 is slid further relative to the beam 36, the intermediate section 66 of the contact beam 36 and the section 192 of the stiffening beam 104 flex. If necessary, the front section 64 of the contact beam 36 can also flex. The beams 36 may flex to the extent that the beams 36 is substantially parallel to the centerlines 106. During insertion of the male terminal 202 into the electrical terminal 20, the higher tensile strength material used to form the stiffening beam 104 increases the normal force for proper electrical connection between the contact beam 36 and the male terminal 202. In the embodiment shown, the hood 24 does not provide any direct electrical contact 22 with the male terminal 202, but the hood 24 adds greater mechanical properties to improve or enhance the electrical properties of the contact beam 36. The single flexible contact beam 36 and the stationary point of contact provided by the indentation 50 create two points of electrical contact with the male terminal 202.

In certain circumstances, the contact assembly formed by the electrical terminal 20 and the attached lead wire may be defective or may need to be serviced. In these circumstances, it is necessary to remove the contact assembly from the connector assembly 200. To remove the contact assembly, the independent secondary lock 214 is first moved back from a locked position to an unlocked position and the retention finger 236 is deflected out of the opening 124 by an appropriate retracting tool (not shown). Once the retention finger 236 is withdrawn from the opening 124, the contact assembly can be withdrawn from the connector assembly 200. As the electrical terminal 20 is withdrawn, the retention finger 134, then the upper ends 44*b*, 46*b*, 112*a*, 114*a* of the side walls 44, 46, 112, 114, and then the rear flap 164 comes into contact with the innermost surfaces 228 of the seal 206. These enlarge the passageway 222 such that tearing of the seal 206 is prevented or avoided. The seal 206 may then be reused upon reinsertion of the repaired contact assembly 90. During this withdrawal, as the seal 206 expands, the seal 206 can expand into the body 230 of the seal cover 208, thereby preventing the seal 206 from being pinched by the seal cover 208.

Figure 18:
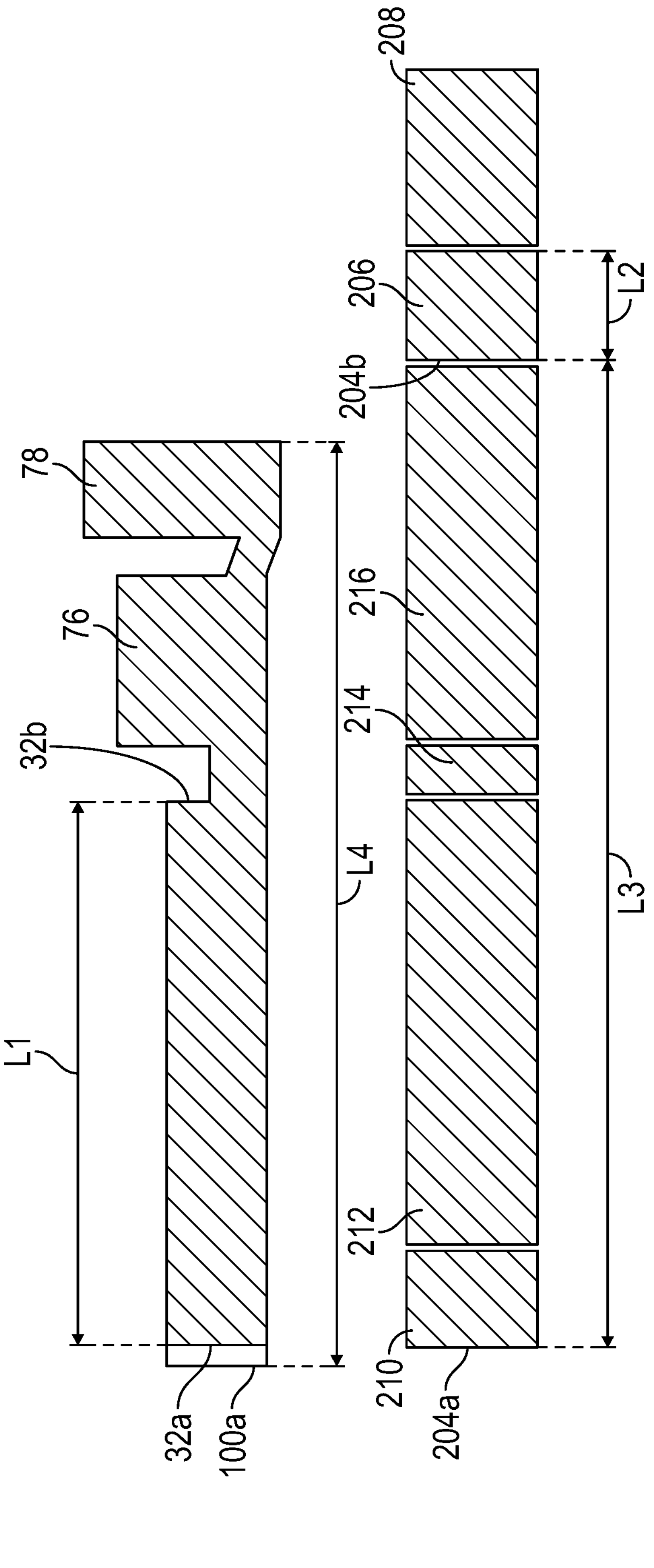
FIG. 18 depicts a schematic view of the electrical terminal and the connector assembly.

As best shown in FIG. 18, the schematic illustrates the relationship of specified structural features of the electrical terminal 20 to corresponding structural features of the connector assembly 200. For overall best performance and the minimum possibility of seal tear, certain relationships are provided. In the present disclosure, the portion of the hood 24 that overlays the contact portion 26 between the ends 32*a*, 32*b* defines a length L1. A length L2 is defined by the seal 206 between the front end 220*a* of the wall 220 and the rear end 220*b* of the wall 220. The first length L1 is a minimum of 1.1 times the second length L2 such that the portion of the hood 24 that overlays the contact portion 26 is longer than the seal 206. Therefore, the electrical terminal 20 can pass through the seal 206 without damaging same. A length L3 is defined by the length of the housing 204 between the ends 204*a*, 204*b*. A length L4 is defined between the front end 100*a* of the hood 24 and the rear end of the insulation crimp portions 78. In combination, the structural features above assure proper alignment of the electrical terminal 20 with respect to the passageway 218 in the housing 204. This prevents the electrical terminal 20 from being misaligned during insertion and minimizes potentially tearing of the seal 206 and degrading seal performance.

It should be noted that, in general, the depiction of whether the electrical terminal 20 is a plug type or a receptacle type in the figures is done merely for illustrative purposes. Therefore, it is envisioned that a particular electrical terminal 20 could be configured to be a plug type, or a receptacle type, or a combination of plug and receptacle, as desired. Therefore, unless specifically noted, the determination of whether the electrical terminal 20 is a receptacle or plug is not intended to be limiting.

In an embodiment, the stiffening beam 104 is eliminated.

In an embodiment, the single contact beam 36 and stiffening beam 104 extend from the top walls 40, 108 and the indentation 50 is provided on the bottom wall 42. In an embodiment, the stiffening beam 104 is eliminated, and the single contact beam 36 extends from the top wall 40 and the indentation 50 is provided on the bottom wall 42.

In an embodiment, the contact beam 36 extends from one of the side walls 44, 46 and the indentation 50 extends from the other side wall 44, 46. In an embodiment, the stiffening beam 104 is eliminated, and the contact beam 36 extends from one of the side walls 44, 46 and the indentation 50 extends from the other side wall 44, 46.

While a single contact beam 36 and stiffening beam 104 are shown and described, a pair of contact beams and stiffening beams can be provided as shown in U.S. Pat. No. 10,886,664 in combination with one or more of the lock projections 120, 126/lock recesses 156, 160 and the flaps 158, 162, 164. In this embodiment, the indentation 50 is eliminated.

The use of the terms "a" and "an" and "the" and "at least one" and similar references in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All processes described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. An electrical terminal comprising:

a contact formed of a body having opposite front and rear ends, a passageway formed therethrough, and deflectable contact beam extending from a wall of the body and into the passageway; and a hood partially surrounding the contact, the hood formed of a body having opposite front and rear ends, a passageway formed through the body of the hood, a planar top wall, and a polarization rib extending from the top wall and overlapping a portion of an upper surface of the top wall, wherein a front end of the polarization rib is spaced rearwardly from the front end of the body of the hood, and a front flap extends from the front end of the polarization rib and at an angle relative to the planar top wall, wherein a free end of the front flap is proximate to the top wall.

2. The electrical terminal of claim 1, wherein a rear end of the polarization rib is spaced rearwardly from the rear end of the body of the hood, and further comprising a rear flap extending from a rear end of the polarization rib and at an angle relative to the planar top wall, wherein a free end of the rear flap is proximate to the top wall.

3. The electrical terminal of claim 2, further comprising curved flanges extending from the front end of the body of the hood.

4. The electrical terminal of claim 2, further comprising a retaining finger extending at an angle relative to the rear end of the hood, the retaining finger partially obstructing a rear end of the passageway through the contact.

5. The electrical terminal of claim 1, further comprising a lock projection extending upward from the top wall, and wherein the polarization rib has a lock recess provided in a lower surface thereof, the lock projection seating within the lock recess.

6. The electrical terminal of claim 5, further comprising a second lock projection extending upward from the top wall, and wherein the polarization rib has a second lock recess provided in a lower surface thereof, the second lock projection seating within the second lock recess.

7. The electrical terminal of claim 1, wherein the polarization rib has a front section and a rear section separated by a space, wherein the front flap extends from a front end of the front section, and further comprising a front flap extending from a front end of the rear section which is proximate to the space, the front flap extending from the rear section extending at angle relative to the planar top wall, wherein an end of the front flap extending from the rear section within the space.

8. The electrical terminal of claim 7, further comprising an opening through the top wall, the opening at least partially aligning with the space.

9. The electrical terminal of claim 7, wherein a rear end of the rear section of the polarization rib is spaced rearwardly from the rear end of the body of the hood, and further comprising a rear flap extending from a rear end of the rear section and at an angle relative to the planar top wall, wherein a free end of the rear flap is proximate to the top wall.

10. The electrical terminal of claim 7, further comprising a front lock projection extending upward from the top wall, and wherein the front section of the polarization rib has a front lock recess provided in a lower surface thereof, the front lock projection seating within the front lock recess, and a rear lock projection extending upward from the top wall, and wherein the rear section of the polarization rib has a rear lock recess provided in a lower surface thereof, the rear lock projection seating within the rear lock recess.

11. The electrical terminal of claim 1, wherein the body of the contact defines a contact portion, and the contact further includes a wire securing portion extending from the rear end of the contact portion and which is configured to connect to exposed conductors of a lead wire and to connect to insulation of the lead wire, and the hood partially surrounds the contact portion, with the front end of the hood being forward of the front end of the contact portion, wherein a first length is defined between the opposite front and rear ends of the hood; and further comprising a connector assembly comprising a housing, a seal and a seal cover, the housing being disposed forward of the seal and the seal cover being disposed rearward of the seal, wherein a second length is defined between front and rear ends of the seal, the first length being a minimum of 1.1 times the second length.

12. The electrical terminal of claim 1, further comprising curved flanges extending from the front end of the body of the hood.

13. The electrical terminal of claim 1, wherein e contact further comprises a wire securing portion configured to connect to exposed conductors of a lead wire and to connect to insulation of the lead wire.

14. The electrical terminal of claim 13 in combination with a connector assembly, comprising a housing, a seal and a seal cover, the housing being disposed forward of the seal and the seal cover being disposed rearward of the seal, wherein a first length is defined by a portion of the hood that overlays the contact, and a second length is defined between front and rear ends of the seal, the first length being a minimum of 1.1 times the second length.

15. The electrical terminal of claim 1, further comprising an indentation formed in a wall of the body of the contact opposite from the wall from which the deflectable contact beam extends, the indentation extending into the passageway of the contact, the deflectable contact beam and the indentation aligning with each other.

16. The electrical terminal of claim 15, further comprising a deflectable stiffening beam extending from a wall of the hood, wherein the contact beam is configured to contact the stiffening beam.

17. An electrical terminal comprising:

a contact formed of a body having opposite front and rear ends which define a longitudinal axis therebetween, a passageway formed therethrough, a deflectable contact beam extending from a first wall of the body and into the passageway, and an indentation having opposite front and rear ends extending from a second wall of the body, the indentation extending into the passageway, the second wall being opposite from the first wall such that the indentation at least partially aligns with the deflectable contact beam along the longitudinal axis; and a hood partially surrounding the contact, the hood formed of a body having opposite front and rear ends, a passageway formed through the body of the hood.

18. The electrical terminal of claim 17, wherein the indentation includes an angled portion which transitions into a bowl-like portion.

19. The electrical terminal of claim 17, further comprising a deflectable stiffening beam extending from a wall of the hood, wherein the contact beam is configured to contact the stiffening beam.

20. The electrical terminal of claim 17, wherein the hood further comprises a planar top wall, and a polarization rib extending from the top wall and overlapping a portion of an upper surface of the top wall.

* * * * *